United States Patent [19]

McCollum et al.

[11] Patent Number: 4,539,842

[45] Date of Patent: Sep. 10, 1985

[54] SPRAY PATTERN ANALYZER

[75] Inventors: William A. McCollum, New Castle, Del.; William Larsen, Bozeman, Mont.

[73] Assignee: Accu Tech Associates, Inc., Bozeman, Mont.

[21] Appl. No.: 532,390

[22] Filed: Sep. 15, 1983

[51] Int. Cl.$^3$ .......................................... G01M 19/00
[52] U.S. Cl. .................................. 73/168; 73/432 R
[58] Field of Search ................. 73/432 R, 432 V, 168

[56] References Cited

U.S. PATENT DOCUMENTS

| | | | |
|---|---|---|---|
| 2,483,637 | 10/1949 | Hawthorn et al. | 73/432 R |
| 3,023,623 | 3/1962 | Lang et al. | 73/432 R |
| 3,459,047 | 8/1969 | Kamps | 73/168 |
| 3,540,454 | 11/1970 | Giebelstein | 73/432 R |

FOREIGN PATENT DOCUMENTS 382374  8/1973  U.S.S.R. ............. 73/432 R

Primary Examiner—S. Clement Swisher
Attorney, Agent, or Firm—Richard C. Conover

[57] ABSTRACT

A spray pattern analyzer for use in analyzing spray patterns formed by spray nozzles which are attached to an agricultural spray applicator boom. This analyzer includes a corrugated collector tray mounted on a cart. The cart has wheels for moving the collector tray through the spray pattern. The collector tray is designed so as to receive collector test tubes each being longitudinally aligned with the troughs of the collector tray. When the troughs are partially filled with spray, the collector tray is tilted so that the spray will flow into the test tubes to provide a visual indication of the pattern. The collector tray is constructed in segments to allow the collector tray to be collapsed. Further, the cart is constructed to permit an adjustment of the height of the collector tray from the surface upon which the cart rests.

6 Claims, 12 Drawing Figures

SPRAY PATTERN ANALYZER

BACKGROUND OF INVENTION

This invention relates to spray pattern analyzers and in particular to the spray collection apparatus required to analyze a spray pattern. This invention has particular use in conducting an analysis of spray patterns produced by chemical applicators used in agriculture for applying chemicals to agricultural lands. The present invention is used in the analysis of applicators which conventionally have a boom to which spray nozzles are attached. By making an analysis of the spray pattern produced by these spray nozzles collectively, defective nozzles or improperly adjusted nozzles can be quickly identified. Further, problems of improper boom height for the particular application and problems of improper pressure under which the chemicals are applied can easily and quickly be determined.

The only spray pattern analyzer used with agricultural spray equipment known by the applicant is that described in West German Utility Model No. 6804628. This analyzer includes a corrugated collector tray having troughs which receive the spray ejected from the spray nozzles. This collector tray is mounted on a stand with one side positioned lower than the other side so that spray collected in a trough will run down the trough and out the lower end thereof. Graduated beakers are positioned below the collector tray with a single beaker aligned to receive the spray collected from a single trough. This apparatus is designed to be placed underneath a boom having spray nozzles to collect the spray from the spray nozzles. A comparison of the amount of fluid collected in each of the beakers gives an indication of the spray pattern.

SUMMARY OF INVENTION

The present invention relates to spray pattern analyzers for use in analyzing spray patterns formed by spray nozzles which are attached, for example, to an agricultural spray applicator boom.

The present invention includes a corrugated collector tray mounted on a cart. The cart has wheels for moving the collector tray through the spray pattern when the pattern is larger than the dimensions of the collector tray. The collector tray is designed so as to receive collector test tubes each being longitudinally aligned with the troughs of the corrugaged collector tray. This enables a user to use the collector tray lying on the ground which would be important when the spray is to be applied to the ground surface directly and it is desired to analyze the spray pattern at the ground surface.

When a spray pattern is to be analyzed, the collector tray is moved through the pattern to be analyzed. Spray collects in the troughs of the collector trays. The collector tray is then removed from the spray pattern and the collector tray tilted forwardly so that the fluid will run into and be collected by the test tubes mounted on the tray. The test tubes are provided with floats to give a visual indication of the amount of fluid in each tube. By visually looking at the test tubes collectively an analysis of the spray pattern can be made.

The cart is further provided with apparatus for adjusting the height of the collector tray from the ground so that the collector tray can be positioned to the height above ground where the spray is to be applied.

Finally the collector tray and cart are designed to be portable with the collector tray being divided, in a preferred embodiment, into three units. The units are designed to permit the units to be folded over one another so that the entire apparatus can be collapsed when it is desired to move the apparatus to another location.

The present invention overcomes the disadvantages of other known spray pattern analyzers such as that described in the West German Utility Model No. 6804628. The present invention has a collector tray which is adjustable in height from a position adjacent the ground surface to a position above the ground. The present invention can be used to measure spray patterns larger than the collector tray. The present invention is portable and can be moved and set up easily in the field where measurements are to be made.

With the present invention an analysis of spray patterns can be made easily and effectively in the field where the agricultural spray applicator equipment is located. Adjustments to the spray nozzle, boom height and/or line pressure of the spray fluid can be made and the equipment tested again until the problem is resolved. With this apparatus spray applicators can be accurately adjusted in the field to save costs of wasted chemicals and to prevent crop damage because of under or over application of the chemicals to be sprayed.

BRIEF DESCRIPTION OF THE DRAWINGS

In order that the invention may be clearly understood and readily carried into effect, a preferred embodiment will now be described, by way of example only, with reference to the accompanying drawings wherein.

DESCRIPTION OF A PREFERRED EMBODIMENT

Figure 1:
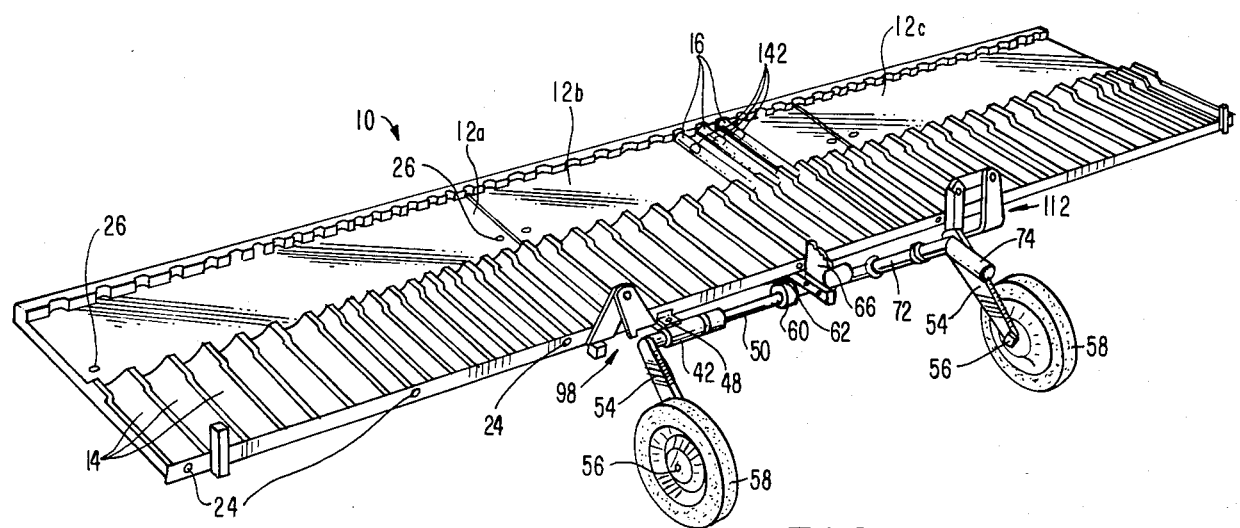
FIG. 1 is a perspective front view of the pattern analyzer according to the present invention.
Figure 2:
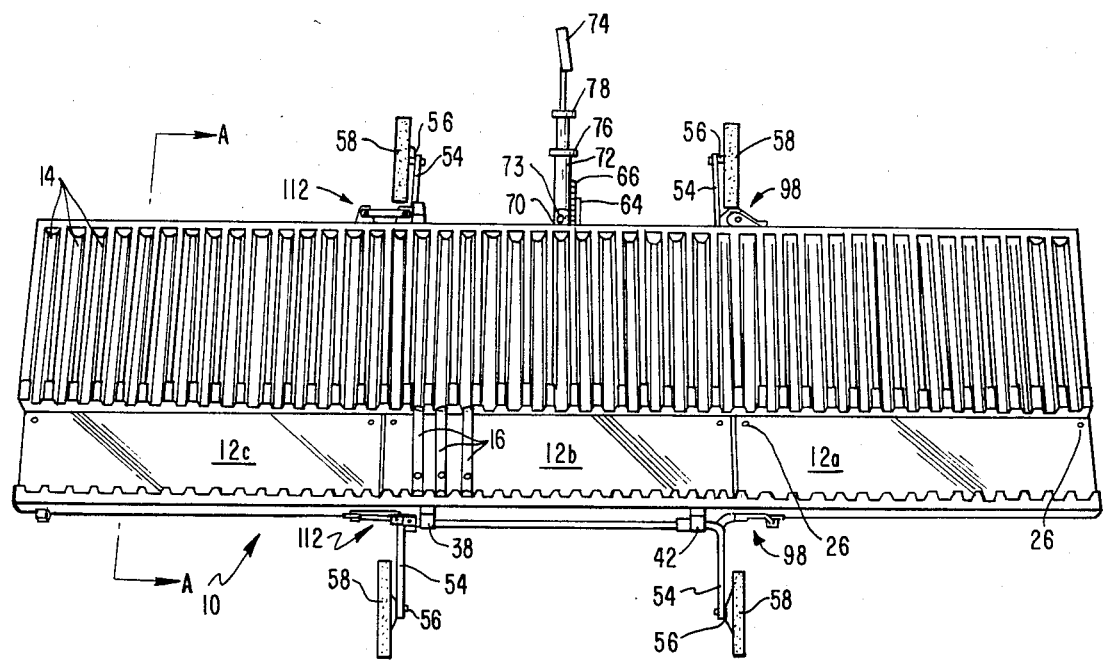
FIG. 2 is a top view of the pattern analyzer according to the present invention.
Figure 6:
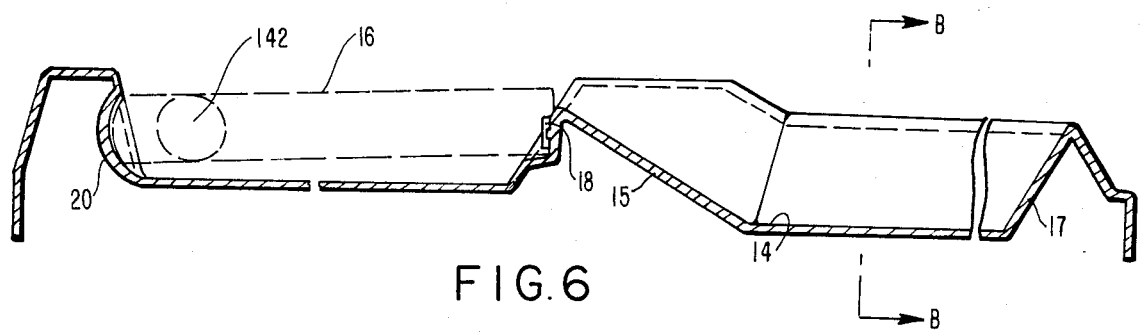
FIG. 6 is a longitudinal cross-sectional view of one of the troughs in the collecting trays along A—A in FIG. 2.
Figure 7:
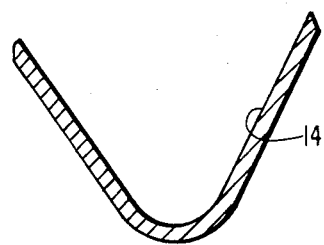
FIG. 7 is a cross-sectional view along line B—B in FIG. 6.

The pattern analyzer 10 according to the present invention is shown in FIG. 1. This analyzer 10, in a preferred embodiment, includes three collector trays 12a, 12b and 12c as shown in FIGS. 1 and 2. These collector trays 12a, 12b and 12c are corrugated and have troughs 14 for collecting spray. Each trough 14 has a longitudinal cross-section as shown in FIG. 6 and a lateral cross-section as shown in FIG. 7. Each trough 14 has up rising ends 15 and 17 as shown in FIG. 6 to hold the spray collected in a trough 14 when the collector trays 12a, 12b and 12c are in a horizontal position.

Test tubes 16 are mounted on the collector trays 12a, 12b and 12c with their mouths aligned with the ends of the troughs 14 as shown in FIGS. 1 and 2. The test tubes 16 are held in place by retaining member 18 as shown in FIG. 6. This retaining member 18 engages the lip of the test tube 16. (A test tube 16 is shown in phantom in FIG. 6.) The closed end of test tube 16 is held by support member 20. The collector trays 12a, 12b, 12c are formed of resilient material such as plastic so that the test tube 16 is held under compression between support member 20 and retaining member 18.

Figure 4:
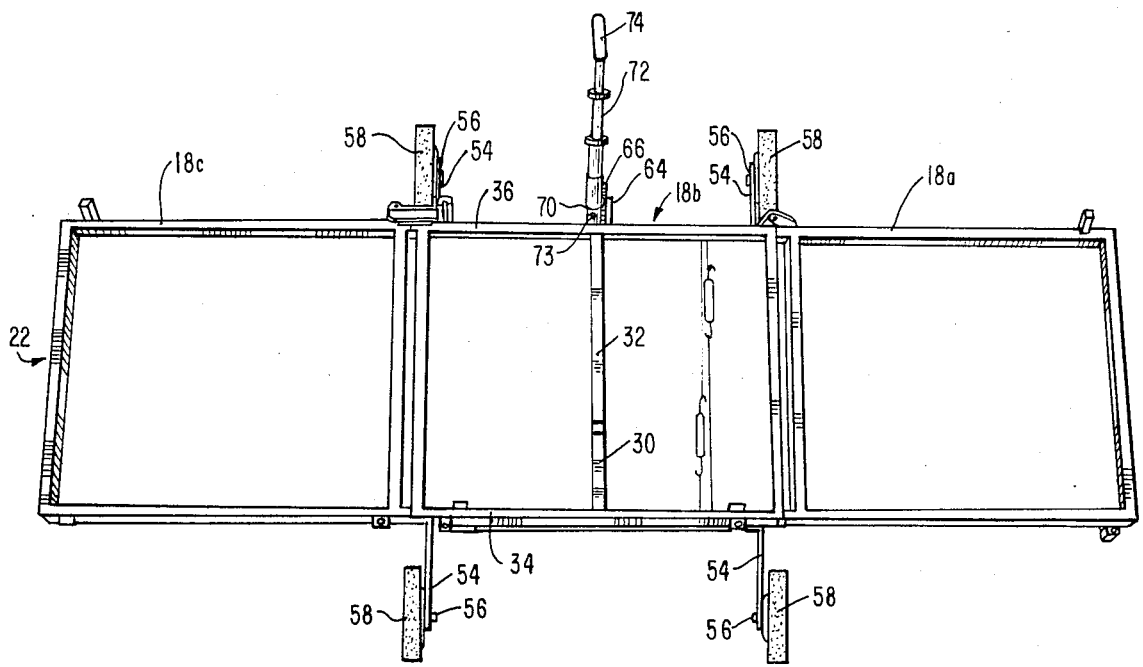
FIG. 4 is a top view of the cart for holding the collecting trays with the collecting trays removed.

The collector trays 12a, 12b and 12c are supported by a cart 22 which is shown FIG. 4. The collector tray 12a is attached to cart 22 with screws 24 as shown in FIG. 1 and screws 26 as shown in FIG. 2. The other collector trays 12b and 12c are attached to the cart 22 in a similar manner.

The cart 22 includes three rectangular frames 18a, 18b and 18c for supporting collector trays 12a, 12b and 12c, respectively. In a preferred embodiment the frames 18a, 18b, and 18c are constructed of rectangular tubing.

Figure 8:
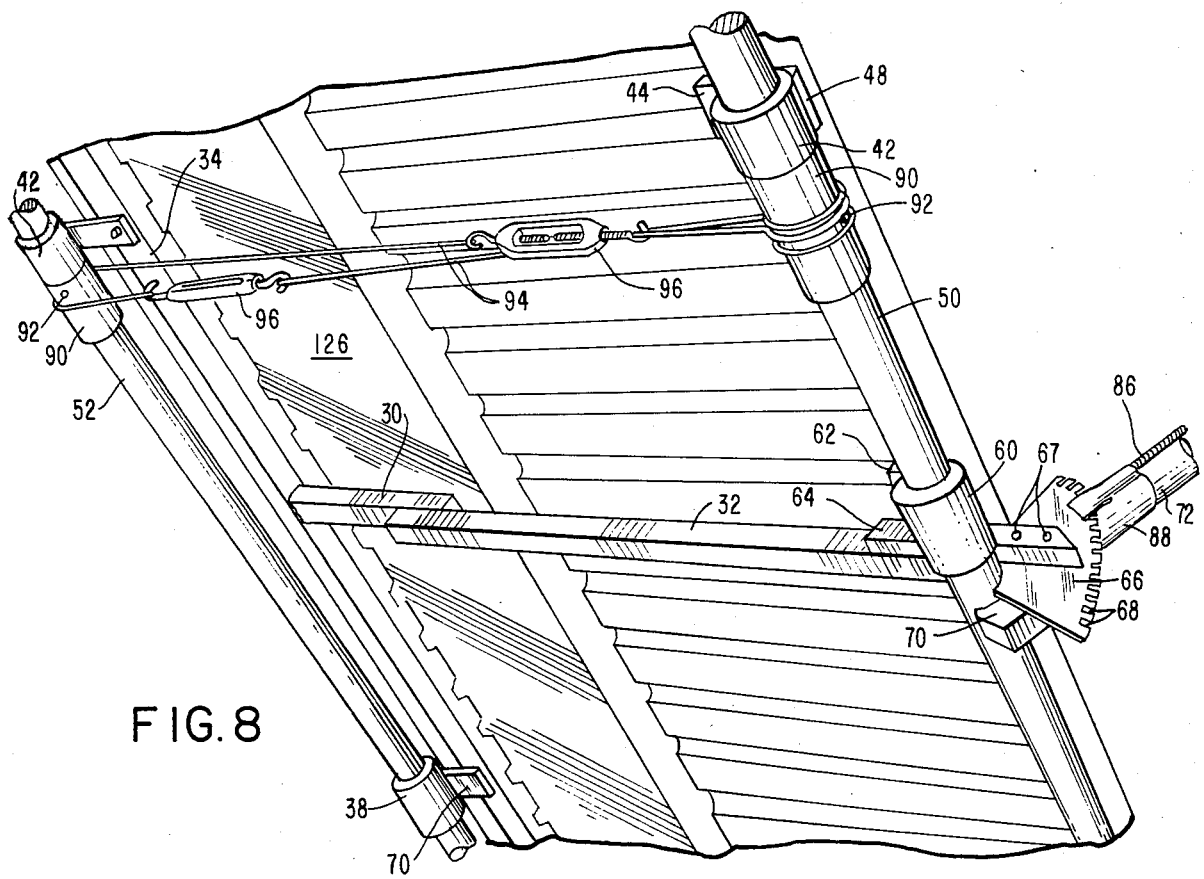
FIG. 8 is a perspective detail bottom view of the height adjustment selector, according to the present invention.

The central frame 18b further includes a central support member having a rear portion 30 on the underside of which is welded a front portion 32. The rear portion 30 is welded to the rear side 34 of frame 18b and the front portion 32 is welded to the front side 36 of frame 18b as shown in FIG. 8.

Figure 9:
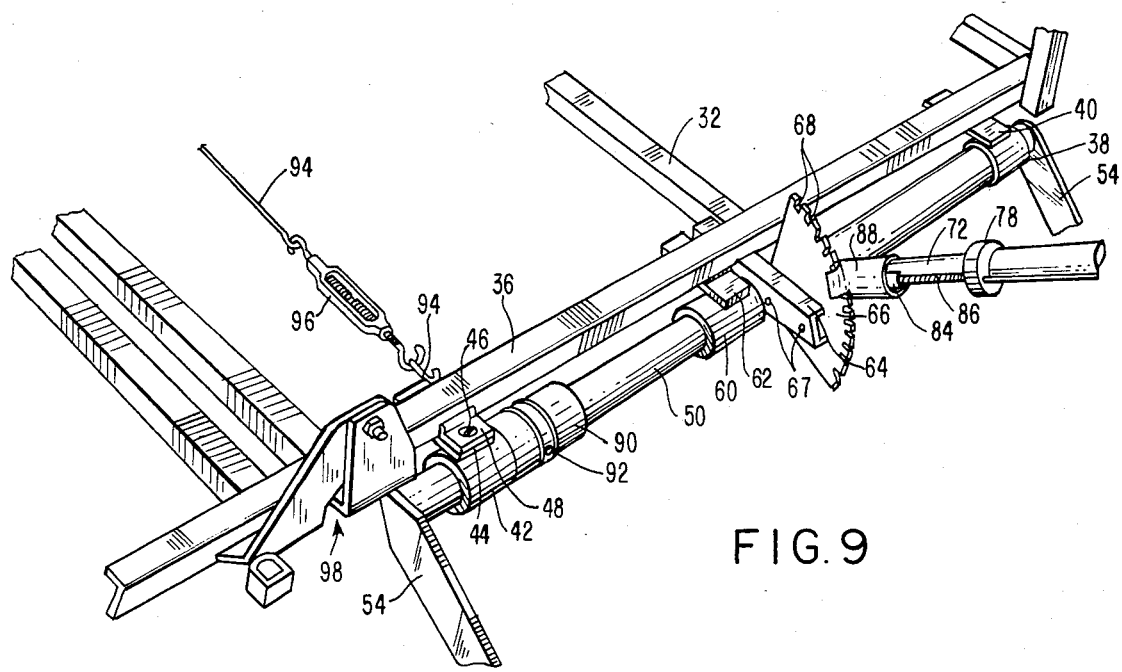
FIG. 9 is a top perspective detail top view of the height adjustment selector, according to the present invention.

The cart 12 further includes a first journal 38 which is attached to the front side 36 of frame 18b with member 40 as shown in FIG. 9. A second journal 42 has a connecting member 44 fixedly attached. This connecting member 44 is removedly attached with a bolt 46 to a supporting member 48 which in turn is fixedly attached to the front side 36 of frame 18b. Similiarly, first and second journals 38 and 42 are attached to the rear side 34 of frame 18b.

A front height adjustment axle 50 is supported by the first and second journals 38 and 42 attached to the front side 36 of frame 18b as shown in FIG. 9 and rear height adjustment axle 52 is supported by the first and second journals 38 and 42 attached to the rear side 34 of frame 18b.

Figure 10:
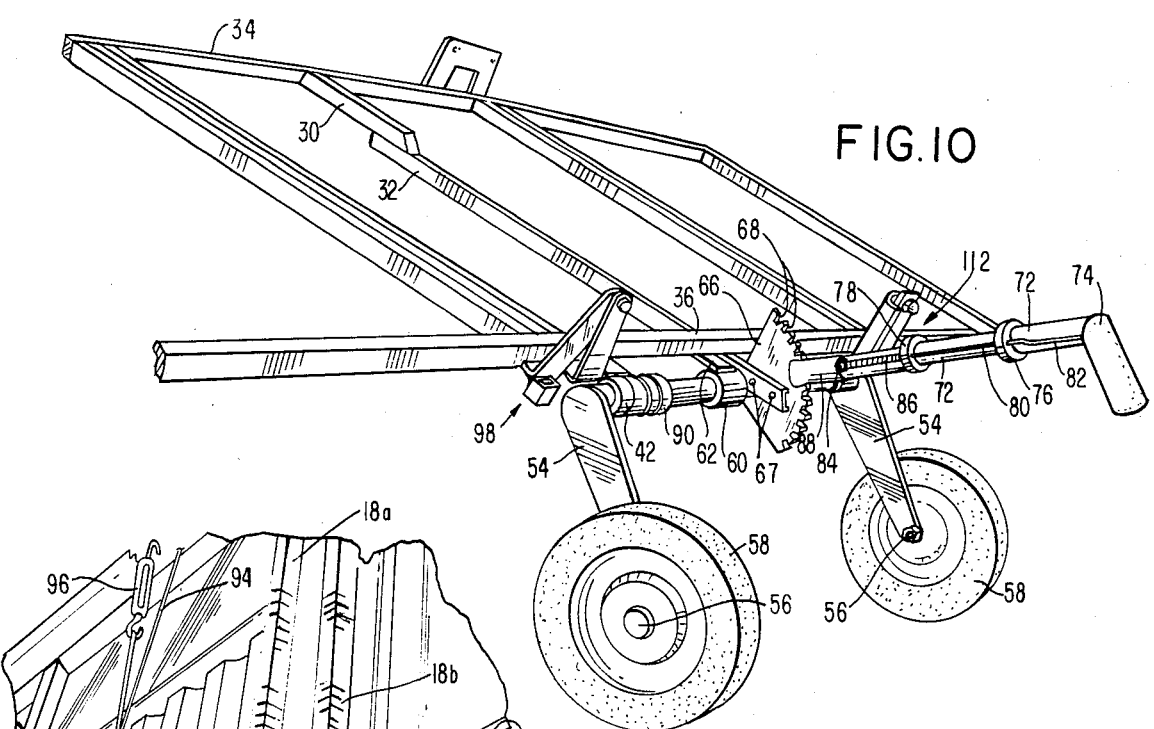
FIG. 10 is a perspective left-side view of the cart in FIG. 4.

The front height adjustment axle 50 and similiarly the rear height adjustment axle 52 have cantilevered arms 54 mounted at each of the ends thereof as shown in FIGS. 9 and 10. These cantilevered arms 54 have transversly attached wheel axles 56 mounted thereto for rotatably supporting wheels 58.

A sleeve 60 is affixed as by welding to the front height adjustment axle 50 as shown in FIG. 9. This sleeve has a stop member 62 affixed which may engage the underside of the front side 36 of frame 18b to limit the clockwise rotation of front height adjustment axle 50 when viewed to the right in FIG. 9.

A supporting member 64 is affixed to the side of the front portion 32 of the central support member as shown in FIGS. 8 and 9 and extends forwardly and beyond the front height adjustment axle 50 as shown in FIGS. 8 and 9. A height adjustment selector 66 is fixedly attached to supporting member 64 with bolts 67 as shown in FIG. 9. The height adjustment selector 66 is shaped as a sector of a circle and has notches 68 along its periphery.

A tubular member 70 is fixedly attached to the front height adjustment axle 50 on one side thereof in a transverse direction as shown in FIG. 4. One end of a handle extension 72 is inserted in the tubular member 70 and is secured therein with a bolt 73. The handle extension 72 is attached to a handle 74 as shown in FIG. 10. The handle extension 72 includes two collars 76 and 78. A height adjustment rod 80 extends through aligned holes (not shown) in collars 76 and 78 and is thereby held held in a position parallel to the axis of the handle extension 72 as shown in FIG. 10. A finger trigger 82 is mounted to the end of the height adjustment rod 80 adjacent the handle 74. The height adjustment rod 80 further has a collar 84 and a spring 86 mounted in surrounding relation to the rod 80 between the collar 84 on rod 80 and the collar 78 on the handle extension 72. The end of the height adjustment rod 80 opposite to that to which the trigger 82 is attached is provided with a blade (not shown) which engages a notch 68 of the height adjustment selector 66. A protective sleeve 88 surrounds the height adjustment rod 80 and handle extension 72 as shown in FIG. 9.

By pulling the trigger 82, the blade attached to rod 80 is disengaged from notch 68. A user may then use handle 74 to rotate the height adjustment axle 50 to a desired position.

The rear height adjustment axle 52 is slaved to the front height adjustment axle 50 as follows. A sleeve 90 is secured to the front height adjustment axle 50 with set screws 92. In a similiar manner a sleeve 90 is also secured to the rear height adjustment axle 52 as shown in FIG. 8. Two cables 94 are provided. Each cable 94 is wound around one of the sleeves 90 as shown in FIG. 8 and the corresponding ends of the cables attached with turn buckles 96. The cables 94 are strung in a figure "8" pattern as shown in FIG. 8. With this configuration, a rotation of the front height adjustment axle 50 causes a rotation of the rear height adjustment axle 52 in the opposite direction.

The front and rear height adjustment axles 50 and 52 are used to adjust the height of the frames 18a, 18b and 18c from the ground surface. A user pulls on trigger 82 with a finger thus disengaging the blade attached to rod 80 from notch 68. The user then utilizes handle 74 to rotate the front height adjustment axle 50. Depending on the direction of rotation, the cantilevered arms 54 attached to wheels 58 are caused to move either outwardly thus lowering the frames 18a, 18b and 18c or move inwardly thus raising the frames 18a, 18b and 18c. The frames 18a, 18b and 18c can be positioned flush with the ground surface or to a number of positions above the ground. The maximum height, however, is limited by the stop member 62 which engages the underside of the front member 36 of frame 18b when the maximum height is reached. At the desired height, the user releases the trigger 82 and the spring 86 causes the blade attached to rod 80 to engage a notch 68 which corresponds with this position.

Figure 3:
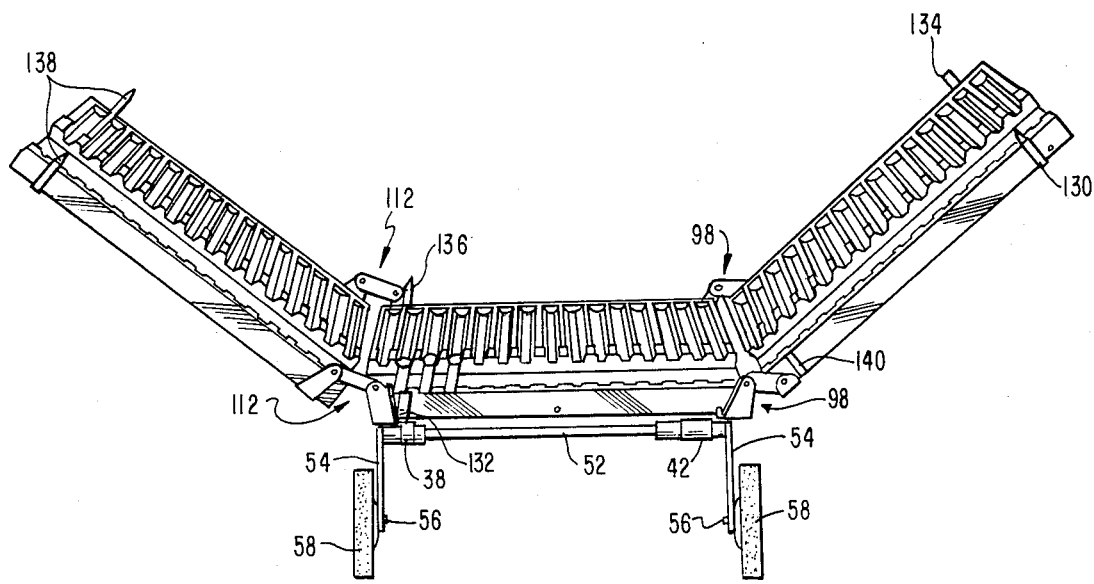
FIG. 3 is a perspective rear view of the present invention with each of the end collecting trays lifted.
Figure 11:
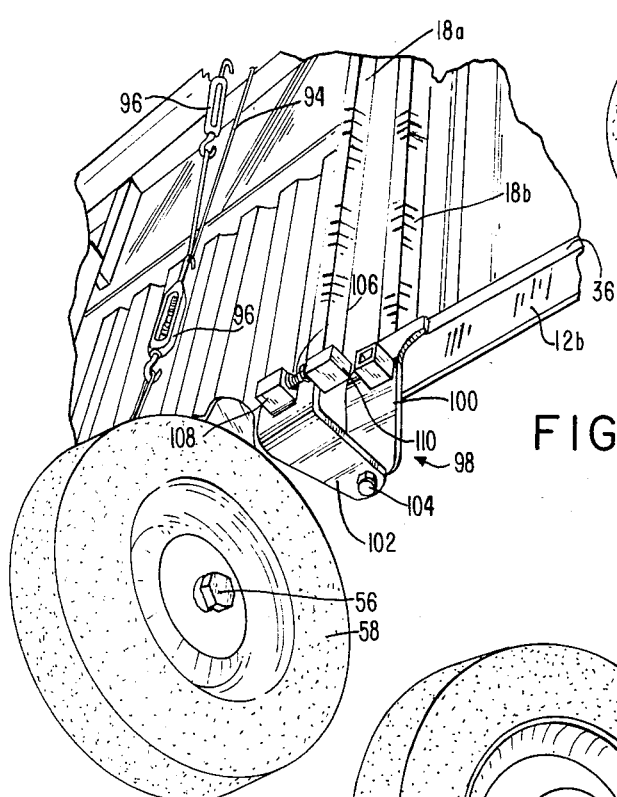
FIG. 11 is a perspective detail bottom view of a collector tray hinge according to the present invention.

The frame 18a is hingedly connected to frame 18b with a two-piece hinge 98 as shown in FIGS. 3, 10 and 11. The hinge 98 includes a first member 100 attached to the frame 18a as shown in FIG. 11 and a second member 102 attached to the frame 18b as shown in FIG. 11. The first and second members 100 and 102 are joined by a bolt 104 to complete the hinge. The hinge 98 in FIG. 11 shows the front hinge connecting the front portions of frames 18a and 18b. Similarly a hinge 98 connects the rear portions of frames 18a and 18b.

An adjustment bolt 106 is threadedly received by support block 108 as shown in FIG. 11. The head of bolt 106 engages a block 110 secured to the front side 36 of frame 18b as shown in FIG. 11. By means of this adjustment bolt 106, the level of frame 18a in relation to frame 18b can be adjusted. This permits the two frames to be positioned level with one another when the frames are laid out as in FIG. 1. Similarly as adjustment bolt 106, a support block 108 and block 110 are provided adjacent the hinge 98 connecting the rear side portions of frames 18a and 18b.

Figure 12:
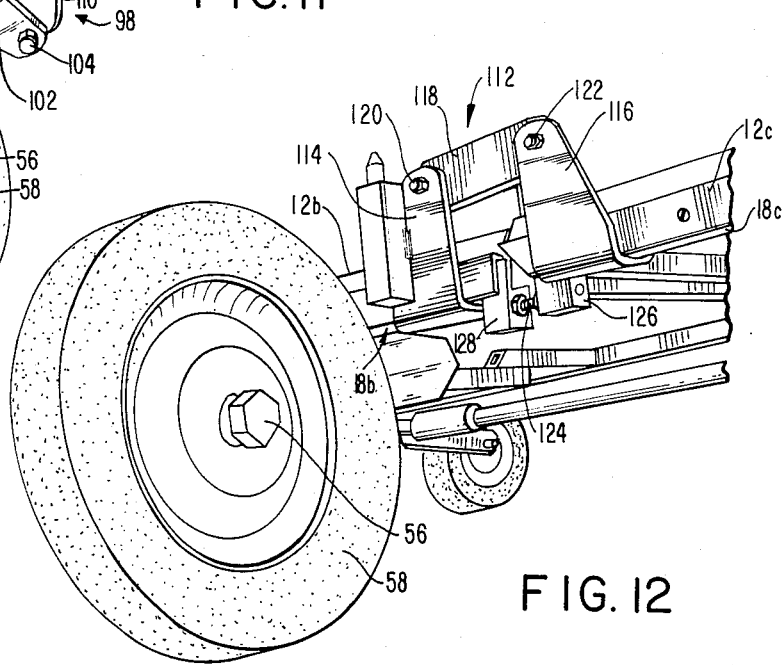
FIG. 12 is a perspective detail bottom view of another collector tray hinge according to the present invention.

The frame 18c is hingedly connected to frame 18b with a three-piece hinge 112 as shown in FIGS. 3, 10 and 12. The hinge 112 includes a first member 114 attached to the frame 18b as shown in FIG. 12, a second member 116 attached to frame 18c and an intermediate hinge extension member 118 which is rotatably attached to the first member 114 with bolt 120 and is rotatably attached to the second member 116 with bolt 122. The hinge 112 in FIG. 12 shows the front hinge connecting the front portion of frames 18b and 18c. Similarly a hinge 112 connects the rear portions of frames 18b and 18c. An adjustment bolt 124, a support block 126 and block 128 are provided in conjunction with front and rear hinges 112 which function similiarly to adjustment bolt 106, support block 108 and block 110 shown in FIG. 11 to align the frame 18c with frame 18b.

Figure 5:
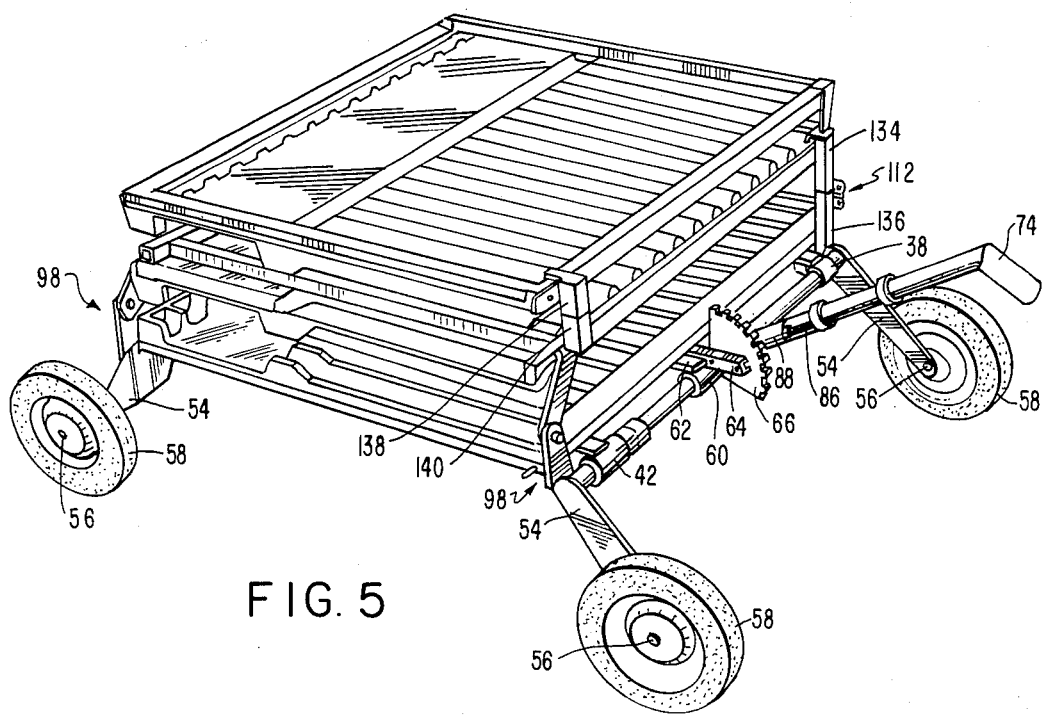
FIG. 5 is a perspective view of the present invention with the collecting trays folded over in the transporting position.

With the hinges 98 and 112, the spray pattern analyzer 10 can be collapsed into a transportable configuration as shown in FIG. 5. First the frame 18a with collector tray 12a is folded over tray 12b as shown in FIGS. 3 and 5. The male guide 130 attached to frame 18a is received by female guide 132 attached to frame 18b and female guide 134 attached to frame 18a receives the male guide 136 attached to frame 18b.

Next the collector tray 12c is folded over tray 12a as shown in FIGS. 3 and 5. The male guides 138 attached to frame 18c are received by female guides 140 attached to frame 18a.

To use this pattern analyzer 10, a user unfolds the collector trays 12c and 12a from their position shown in FIG. 5 to the position shown in FIG. 1. Adjustments made with adjustment bolts 106 and 124 are made to level and align collector trays 12a and 12c, respectively, with collector tray 12b. Test tubes 16 are inserted in the collector trays 12a, 12b and 12c so that there is one test tube 16 for each trough 14. Floats 142 shown in FIGS. 1 and 2 are inserted in the test tubes to indicate the fluid content in the test tube.

The user then positions the pattern analyzer 10 under the boom with spray nozzles to be tested. The track of the wheels should be perpendicular to the boom. The sprayer is turned on and the collector trays 12a, 12b and 12c are pushed under the spray pattern, then completely through the pattern and then pulled back. In a preferred embodiment, this process is continued until the troughs are filled from one-quarter to one-half of the height of the trough. When enough volume is collected, the collector trays 12a, 12b and 12c are removed from the spray area and moved away from the boom. The front end of the spray pattern analyzer 10 is then lifted upwardly to tilt the collector trays 12a, 12b, and 12c so that the spray collected in the troughs 14 will flow into the test tubes. The floats 142 will provide a visual indication of the spray pattern. In this manner defective nozzles, improper boom height and insufficient line pressure can easily and quickly be identified. This equipment can be used to analyze spray patterns which are larger than the area encompassed by the collector trays 12a, 12b and 12c. The analysis is run beginning from the end of the boom working toward the center with an analysis done with each transverse sweep under the boom. It is not a problem that the transverse sweep overlap one another. In fact, some overlap is desirable.

Further, with the height adjustment capability a user can select the height of the collector trays 12a, 12b and 12c from the ground level to analyze the spray pattern at the point of application of the spray in the field where the spray is to be applied. This is important because the spray pattern changes in a horizontal plane the further the distance the plane of the spray pattern to be analized is from the nozzles located on the boom.

While the fundamental novel features of the invention have been shown and described, it should be understood that various substitutions, modifications and variations may be made by those skilled in the art without departing from the spirit or scope of the invention. Accordingly, all such modifications and variations are included in the scope of the invention as defined by the following claims.

I claim:

1. Apparatus for analyzing spray patterns comprising:
    a collector tray having a trough formed therein;
    a test tube having its longitudinal axis aligned parallel with the longitudinal axis of the trough and having a mouth mounted adjacent to an end of the trough;
    a cart means for holding the collector tray in a horizontal position facing upwardly and for movably positioning the collector tray within a horizontal plane of a spray pattern.

2. Apparatus for analyzing spray patterns produced by spray applicators used in agricultural production comprising:
    a collector tray having more than one trough formed therein;
    a test tube for each trough, the test tube having its longitudinal axis aligned parallel with the longitudinal axis of the corresponding trough and having a mouth mounted adjacent to an end of the trough; and
    a cart means for holding the collector tray in a horizontal position facing upwardly and for movably positioning the collector tray within a horizontal plane of a spray pattern.

3. The apparatus according to claim 2 further including means for adjustably positioning the collector tray in height with respect to a surface upon which the cart rests.

4. The apparatus according to claim 2 wherein the collector tray is segmented and further has hinge means for connecting the segments together such that the segments can be folded over one another to permit the apparatus to be collapsed into a transporting configuration.

5. The apparatus according to claim 2 wherein each trough has up rising ends thereof to capture spray in the trough when the trough is in a upwardly facing horizontal position.

6. The apparatus according to claim 5 wherein each test tube contains a float means for providing a visual indication of the amount of fluid in the test tubes when the collector tray is tilted to a position where the test tubes have their longitudinal axes in the vertical direction to permit spray collected in the troughs to flow into the test tubes.

* * * * *